(12) United States Patent
Meurer et al.

(10) Patent No.: US 6,543,725 B1
(45) Date of Patent: Apr. 8, 2003

(54) FLEXIBLE, FOLDABLE SOLAR GENERATOR FOR SPACECRAFTS

(75) Inventors: René Meurer, Bruckmühl (DE); Gunter Küchler, Haselan (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/762,666

(22) PCT Filed: Jul. 24, 1999

(86) PCT No.: PCT/DE99/02278

§ 371 (c)(1),
(2), (4) Date: Apr. 4, 2001

(87) PCT Pub. No.: WO00/10207

PCT Pub. Date: Feb. 24, 2000

(65) Prior Publication Data (65)

(30) Foreign Application Priority Data

Aug. 11, 1998 (DE) .......................... 198 36 272

(51) Int. Cl.[7] .............................. B64G 1/44
(52) U.S. Cl. ................ 244/173; 136/245; 136/292
(58) Field of Search ................ 244/173; 136/245, 136/244, 292

(56) References Cited

U.S. PATENT DOCUMENTS

| | | | | |
|---|---|---|---|---|
| 4,652,693 A | * | 3/1987 | Bar-On ................... | 136/244 |
| 5,298,085 A | * | 3/1994 | Harvey et al. ........... | 136/244 |
| 5,961,738 A | * | 10/1999 | Benton et al. ........... | 136/245 |
| 6,291,761 B1 | * | 9/2001 | Takada et al. ........... | 136/244 |
| 2002/0074033 A1 | * | 6/2002 | Kular et al. ............. | 136/244 |

FOREIGN PATENT DOCUMENTS

| | | |
|---|---|---|
| DE | 3210312 | 9/1983 |
| JP | 60147152 | 8/1985 |
| JP | 02234900 | 9/1990 |
| JP | 03262800 | 11/1991 |

OTHER PUBLICATIONS

Patent Abstracts of Japan of JP 60 147152 Dated Aug. 3, 1985.
Patent Abstracts of Japan of JP 03 262800 Dated Nov. 22, 1991.
Patent Abstracts of Japan of JP 02 234900 Dated Sep. 18, 1990.
Van Lent, L.C.M. "Structural Design of the Telecom 2 Solar Array". Proceedings of the European Space Power Conference, ESA Publications, (1989), ESA SP–294, pp. 707–713.

* cited by examiner

Primary Examiner—J. Woodrow Eldred
(74) Attorney, Agent, or Firm—Ladas & Parry

(57) ABSTRACT

A flexible foldable solar generator having an array of a plurality of blankets carrying solar cells hingeably connected to be folded and unfolded. The solar cells are connected together by branches and the branches are connected by connector lines in inner and outer current conducting tracks system arranged outside the blankets. The branches connect the solar cells with the connecting lines in the outer track to form a U-shaped series connection of the cells and the U-shaped series connected cells are connected in parallel by the connecting lines in the inner track where they can be connected to energy systems of the space vehicle.

6 Claims, 4 Drawing Sheets

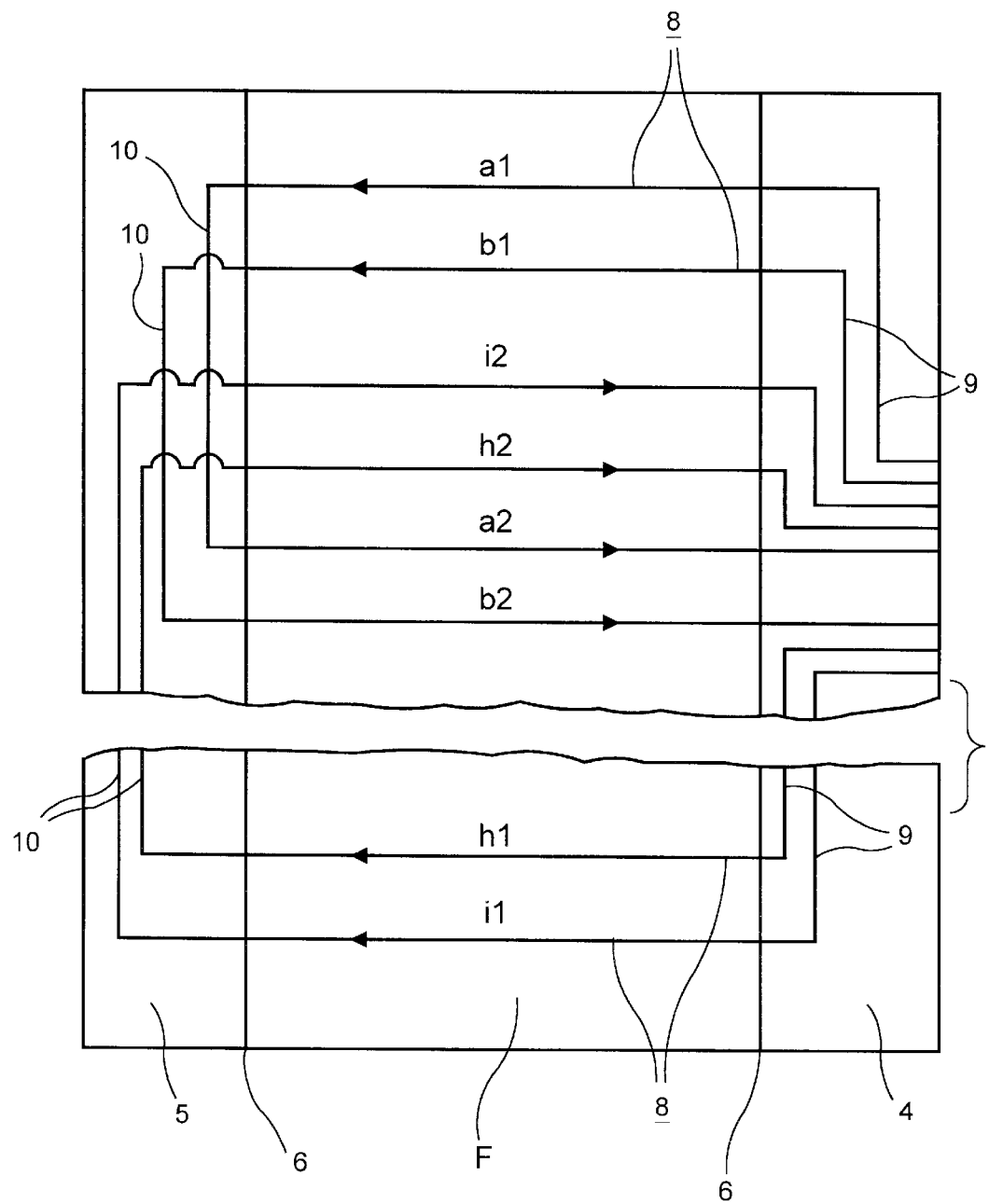
F I G. 2

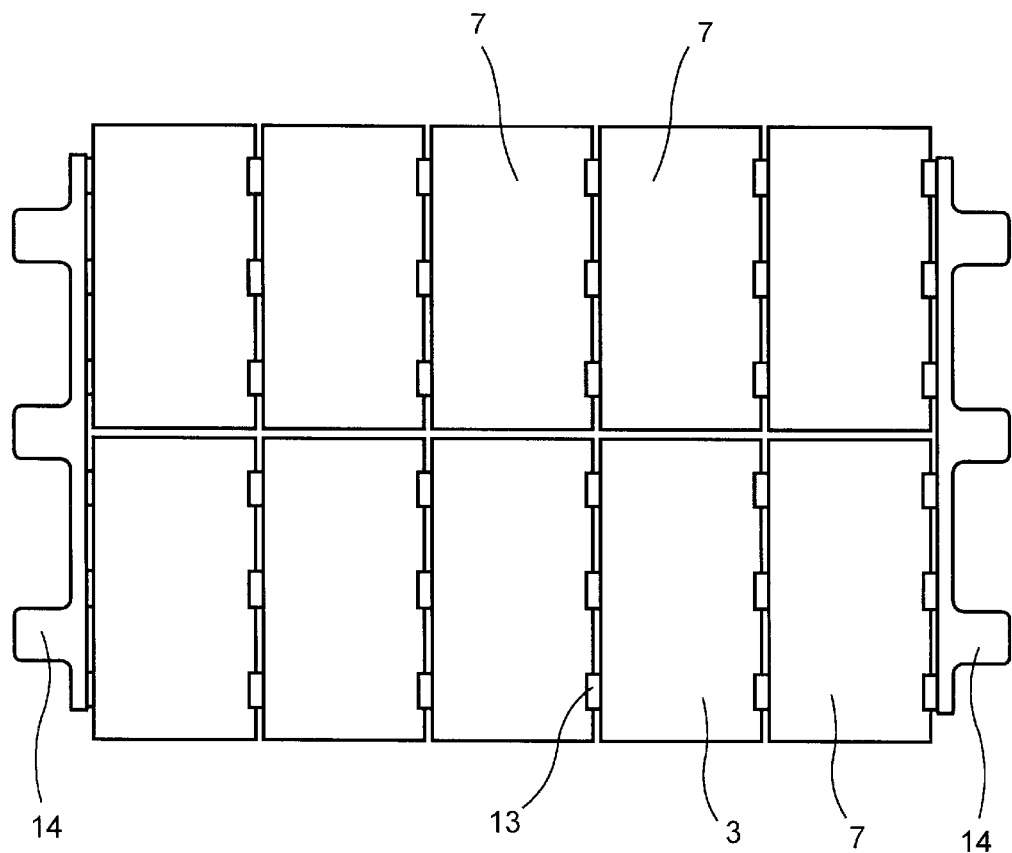
F I G. 5
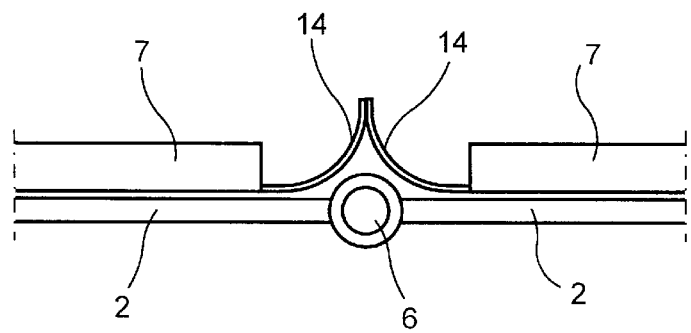
F I G. 6

FLEXIBLE, FOLDABLE SOLAR GENERATOR FOR SPACECRAFTS

BACKGROUND OF THE INVENTION

The invention relates to a flexible foldable solar generator for space vehicles.

The invention relates to a flexible foldable solar generator for space vehicles according to the precharacterising portion of claim 1.

Such solar generators are designed as large and light carrier structures which preferably only contain flexible foil substrates, folded bellows-like, and which are opened out in orbit by telescope-like mechanisms so as to cover a large area.

To take up little room in the hold, these foil surfaces have to be folded at very small spacing of only approx. 2 mm. To this effect, the individual large-area modular carrier foil sections of the solar generator comprise an electrical current-conducting track system which is suitable for interconnecting individual sections in a simple and space-qualified way. The electrical current-conducting track system must generally meet the exacting requirements for operation in space, such as the high thermal alternating stress resulting from sun and earth shadow, as well as extreme demands for reliability throughout the entire duration of the mission. Furthermore, the electrical connecting elements must be designed such that they remain free of any tension load. In addition, for the purpose of exchange and repair of entire solar generator sections, repeated non-destructive disconnection and reconnection must be possible.

From DE 3210312 C3 a solar generator for space vehicles is known which is composed from individual carrier foil sections. The individual sections are connected by means of piano-type hinges. Polyimide foil with one-sided copper lamination, if necessary also with double-sided copper lamination, is used as the starting material for carrier foils.

The reverse side of the solar generator comprises an electrical current-conducting track system made using the photoresist etching process. Starting from the outer carrier foil section, the individual current-conducting tracks for the electrical current obtained from solar cells, is conducted as far as possible on the inside along the entire length of the solar generator, to connectors at the satellite. After infeed to the middle, the current-conducting tracks of the next carrier foil section extend from the middle, in close proximity to the current-conducting tracks of the outer carrier foil sections etc. so that overall on the reverse side, a pine-tree like configuration, with increased occupation of the reverse side towards the inside, of etched conducting tracks results. All current-conducting tracks commence at positive or negative connection positions of the solar cell modules. They are led across fold lines by means of fold-conducting tracks, and across joint axes at the section ends by means of section-conducting track transitions. Such a current-conducting track requires considerable expenditure in material and production effort and significantly increases the weight of the solar generator, thus causing increased launching costs of the space vehicle.

SUMMARY OF THE INVENTION

It is an object of the invention to provide a cost-effective, flexible, foldable solar generator for use on space vehicles.

It is thus the object of the invention to create a cost-effective, flexible, foldable solar generator for use on space vehicles.

It is of advantage if the invention uses a particular way of connecting the solar cell which makes it possible to completely do without current-conducting tracks within the array surface.

Apart from cost savings during production and savings in material, there is a particular advantage in reduced weight as a result of being able to do without the current-conducting track system in the array surface and being able to do without through-hole plating which tends to cause operational breakdowns.

BRIEF DESCRIPTION OF THE FIGURES OF THE DRAWING

An exemplary embodiment of the invention is shown by means of the Figures, as follows:

FIG. 2 a schematic diagram of solar cell series connections of the array;

FIG. 5 a solar cell mini-module of the array; and

FIG. 6 the design of the hinge and conductor connection between adjacent blankets.

DETAILED DESCRIPTION OF THE INVENTION

Figure 1:
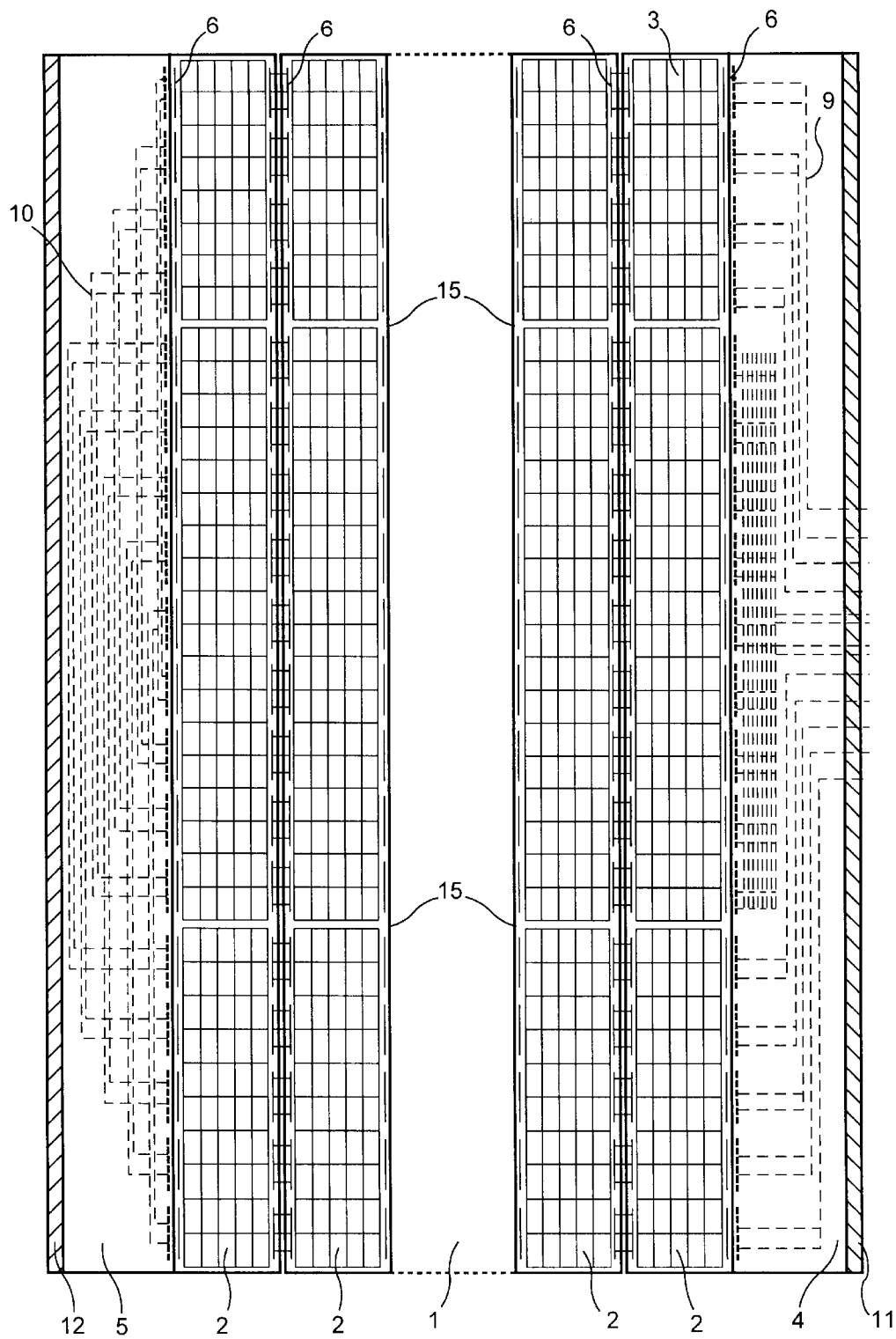
FIG. 1 a general drawing of an array.

The array 1 shown as an example in FIG. 1 comprises 33 blankets 2 carrying solar cells (of which FIG. 1 only shows four blankets for the sake of clarity), an inner current-conducting track system 4, an outer current-conducting track system 5, hinges 6, the solar cells 7 welded to form mini modules 3, end contacts 14 welded together between the mini modules, a base plate 11 and a pressure plate 12.

In the embodiment shown the blankets 2 comprise a Kapton foil with a glass fibre laminate layer, each blanket having a dimension of 3352 mm×285 mm. On the surface of each blanket 2 there are solar cells 7 of which ten each are contained in a mini module 3. On each blanket 2, eighteen mini modules 3 are arranged directly side-by-side so that the direction of the solar cell series connection is parallel to the width of the blankets 2. In another connection arrangement of the solar cells, another arrangement on the blankets may be necessary. On the two longer margins of each blanket, halves of a piano-type hinge 6 extending along the entire blanket margin are fitted. The hinge halves are designed so that they correspond to the half of the respective adjacent blanket.

Except for two instances, the spacing between the individual mini modules 3 of a blanket 2 is 1 mm. Exceptions are the spacing gaps 15 which are designed to weaken flashover field strengths between mini modules with high potential differences.

The current-conducting track systems are also made on flexible blankets whose dimensions correspond to those of the blankets 2 carrying the solar cells. On one longitudinal side, the inner current-conducting track system 4 which is arranged on the inside, directly adjacent to the space vehicle, is mechanically connected to the base plate 11 and on the opposite longitudinal side via hinges 6 to the inner blanket carrying solar cells. The electrical conductor connections between the current-conducting track system 4 and the mini modules 3 of the inner blanket are established in the known way by means of welded-together end contacts of the current-conducting track system and the mini modules. The outer current-conducting track system 5, which is located in the array 1 at the outer position furthest away from the space vehicle, is accordingly mechanically and electrically connected to the blanket carrying the outer solar cells. The outer longitudinal side of the current-conducting track system 5 is mechanically connected to the pressure plate 12.

For the embodiment, the schematic diagram shown in FIG. 2 shows the design and arrangement of electrically parallel series connections 8 of the solar cells on the array 1. The series connections 8 in principle comprise a branch a1 (b1, . . . , h1, i1), of solar cells which are electrically connected in series (in FIG. 2 one branch only is shown in a simplified way as a line), a second branch a2 (b2, . . . , h2, i2) of solar cells which are electrically connected in series, with opposite polarity arrangement of the solar cells when compared to the first branch, an electric line 10 on the outer current-conducting track system 5 which electrically connects in series the two branches, as well as two electrical lines 9 on the inner current-conducting track system 4 for connecting the series connection 8 to the energy processing system of the space vehicle.

The branches with solar cells connected in series extend in the direction of unfolding of the array 1, in a straight line along all blankets 2 carrying solar cells. In FIG. 2 the polarity direction of the solar cells in the individual branches of the series connections 8 is shown by arrow heads at the branches. Those arrow heads point in the direction of increasing potential. In FIG. 2 the area of array 1 comprising solar cells is shown in a simplified way without showing the individual blankets 2 and designated by reference symbol F. According to the details outlined above, in this way the two branches connected in series with the electrical line 10, form U-shaped series connections 8.

In the embodiment shown, nine series connections 8 are arranged on array 1, of which for the sake of simplicity, only four series connections 8 are shown. The branches a1, . . . , i2 of the series connections 8 of the embodiment comprise two rows, electrically connected in parallel, each row comprising one hundred and sixty five solar cells 7 connected in series, so that each series connection 8 comprises six hundred and sixty solar cells 7. Depending on the performance required from the solar generator, other connection arrangements are possible.

Figure 3:
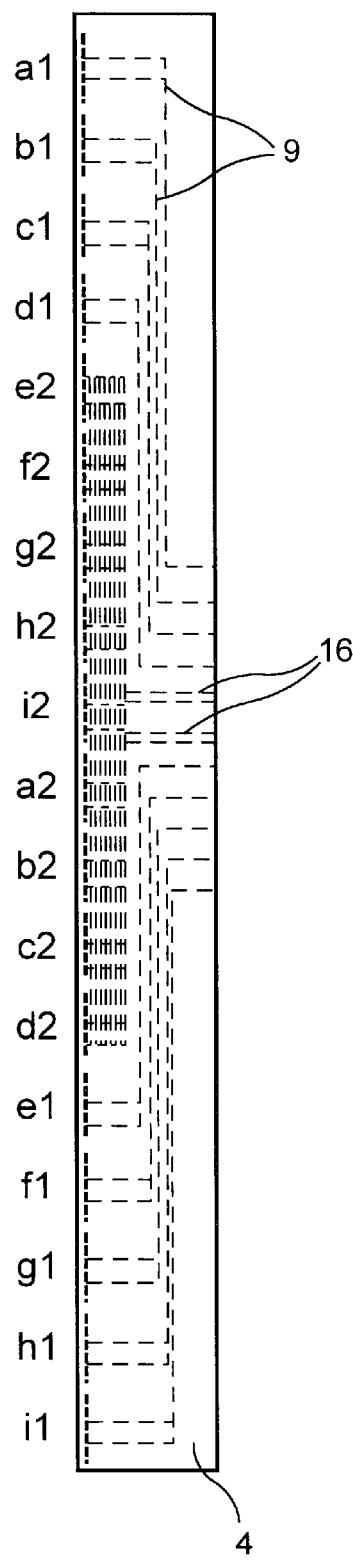
FIG. 3 a blanket of the array with the inner current-conducting track system.

FIG. 3 shows the inner current-conducting track system 4 with the electrical lines 9 applied to the blanket.

In the embodiment described here, the branches of the series connections 8 are arranged on array 1 in a particular arrangement. This arrangement is selected such that maximum potential differences between the solar cells of adjacent branches only occur in two places on array 1. FIG. 3 shows this allocation of the branches (not shown) to the interfaces of the electrical lines 9 by means of reference symbols a1, . . . , i2 of the branches. The branches are sequentially arranged on array 1 as follows: a1-b1-c1-d1-e2-f2-g2-h2-i2-a2-b2-c2-d2-e1-f1-g1-h1-i1. Using this sequence, maximum potential differences only occur between the pairs of branches d1 and e2 as well as between the pairs of branches d2 and e1 to the "inner" margin of area F comprising solar cells. On the blankets 2, the mini modules 3 of these pairs of branches are spaced apart from each other by a spacing gap 15 of 1.5 mm.

A further characteristic of the sequence consists of the branches a2, . . . , i2 being arranged side-by side so that as a result of equipotentiality the electrical lines 9 to these nine branches are taken together to collection lines 16 lead to the energy processing system of the space vehicle. But this is not absolutely necessary.

Figure 4:
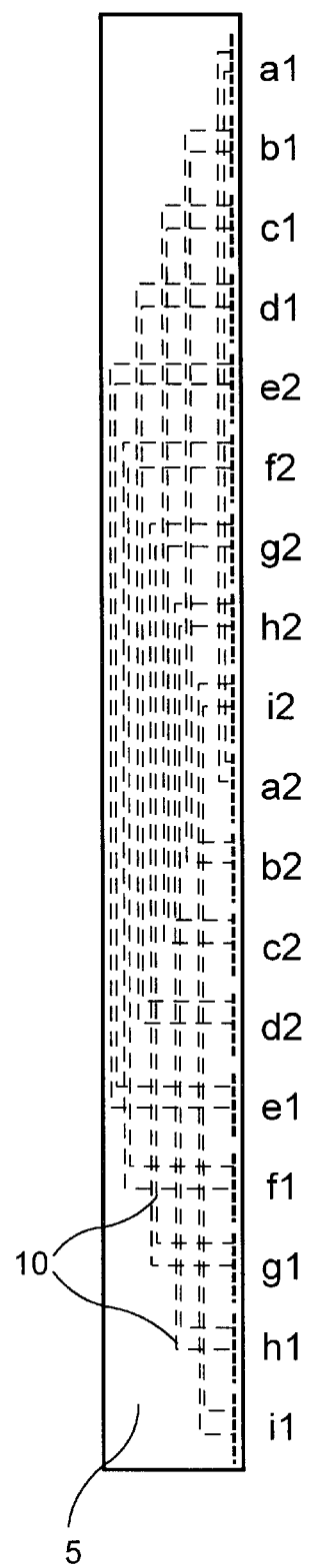
FIG. 4 a blanket of the array with the outer current-conducting track system.

FIG. 4 shows the outer current-conducting track system 5 which is identical in design to the inner current-conducting track system 4, except to the design of the electrical conductors. Each of the electrical conductors 10 connects two of the branches a1, . . . , i2, which together form a U-shaped series connection 8. To this effect, the following pairs of branches are taken together: a1 and a2, b1 and b2, . . . , h1 and h2, i1 and i2. Allocation of the electrical lines 10 to the branches a1, . . . , i2 of array 1 are shown in FIG. 4 by the reference symbols of the branches (branches not shown).

FIG. 5 shows the design of a mini module 3. In the embodiment, ten solar cells 7 taken together, are welded to a mini module via solar cell connectors 13, and bonded to a common cover glass. In the mini module 3, the solar cells 7 are arranged in two rows, said rows being arranged side-by-side; each row comprising five solar cells connected in series. The ends of the two rows are connected to end contacts 14. The end contacts 14 are designed such that the two rows are connected in parallel in the mini module 3. In another electrical design of the solar generator, the end contacts can also serve as a series connection only.

By means of end contacts 14, series connection of adjacent mini modules 3 of adjoining blankets 2 is carried out in the known manner as shown in FIG. 6. The length of a mini module 3 agrees with the short edge length of the blankets 2 so that connection of the end contacts 14 at the fold lines of array 1 takes place in the area of the hinge 6. The end contacts 14 protrude from the fold lines so that welding together of two end contacts 14 results in the turned up bent shape of the welded-together end contacts 14, as shown in FIG. 6. This bent shape provides the advantage in that during folding of the array there are no mechanical loads acting on the end contacts 14.

What is claimed is:

1. A solar generator for space vehicles, comprising at least one foldable array with a current-conducting track system integrated in the array, the array comprising a plurality of flexible blankets with solar cells, each individual blanket extending perpendicular to a direction of unfolding of the array, hinges interconnecting said blankets for folding and unfolding the array, the solar cells being connected on the array by a plurality of parallel and series connections, said current-conducting track system comprising an inner current-conducting track and an outer current-conducting track, the inner and outer current-conducting tracks system each being arranged outside the blankets carrying the solar cells, said series connections of the solar cells being U-shaped, in which ends of two branches, extending across the entire array in the direction of unfolding, of electrically interconnected solar cells at the outer margin located away from the space vehicle, are connected in series by electrical lines in the outer current-conducting track, ends of the series connection being connected in parallel at the inner margin of the array by electrical lines at the inner current-conducting track to energy processing systems of the space vehicle.

2. A solar generator according to claim 1, wherein the inner and the outer current-conducting tracks system each comprises flat electrical conductors integrally formed on the flexible blanket.

3. A solar generator according to claim 1, wherein the branches for the series connections of each array are arranged so that maximum potential differences occur only between two adjacent pairs of branches.

4. A solar generator according to claim 1, wherein said electrical lines in said current conducting tracks system comprise integrated flat electrical conductors.

5. A solar generator according to claim 4, wherein said blankets with the solar cells are separate from the current-conducting track system and devoid of said electrical flat conductors therein.

6. A solar generator according to claim 1, wherein a plurality of arrays are combined to form a solar cell wing.

* * * * *